(12) United States Patent
Kim et al.

(10) Patent No.: US 11,549,856 B2
(45) Date of Patent: Jan. 10, 2023

(54) PRESSURE SENSING DEVICE AND PROCESSING METHOD THEREOF

(71) Applicant: Tyco Electronics AMP Korea Co., Ltd., Gyeungsan-si (KR)

(72) Inventors: Hyung Jin Kim, Gyeongsan-si (KR); Eul-Chul Byeon, Gyeongsan-si (KR); Yong Seon Park, Gyeongsan-si (KR)

(73) Assignee: Tyco Electronics AMP Korea Co., Ltd., Gyeongsan-si (KR)

( * ) Notice: Subject to any disclaimer, the term of this patent is extended or adjusted under 35 U.S.C. 154(b) by 214 days.

(21) Appl. No.: 17/119,533

(22) Filed: Dec. 11, 2020

(65) Prior Publication Data

US 2021/0181050 A1 Jun. 17, 2021

(30) Foreign Application Priority Data

Dec. 11, 2019 (KR) .................. 10-2019-0164966
Dec. 11, 2019 (KR) .................. 10-2019-0164968
Nov. 19, 2020 (KR) .................. 10-2020-0155688

(51) Int. Cl.
*G01L 9/00* (2006.01)
*G01L 27/00* (2006.01)

(52) U.S. Cl.
CPC .......... *G01L 9/0042* (2013.01); *G01L 27/005* (2013.01)

(58) Field of Classification Search
CPC ... G01L 9/0042; G01L 27/005; G01L 19/083; G01L 19/00
See application file for complete search history.

(56) References Cited

U.S. PATENT DOCUMENTS

| 5,757,357 | A | * | 5/1998 | Grande | G01R 19/25 345/440.1 |
|---|---|---|---|---|---|
| 2012/0002527 | A1 | * | 1/2012 | Minemura | G11B 20/10481 369/59.21 |
| 2012/0136591 | A1 | * | 5/2012 | LeMense | B60C 23/0488 702/50 |
| 2012/0169906 | A1 | * | 7/2012 | Chiou | H04N 5/2355 348/254 |
| 2017/0023429 | A1 | * | 1/2017 | Straeussnigg | H03M 3/462 |
| 2018/0287623 | A1 | * | 10/2018 | Kim | H03M 1/0609 |

FOREIGN PATENT DOCUMENTS

| DE | 102019128441 A1 | * | 4/2021 | ........... B60L 3/0046 |
|---|---|---|---|---|
| JP | 2012129849 A | * | 7/2012 | |
| JP | 2021089157 A | * | 6/2021 | |

* cited by examiner

*Primary Examiner* — Francis C Gray

(74) *Attorney, Agent, or Firm* — Barley Snyder

(57) ABSTRACT

A pressure sensing device includes a pressure signal receiver configured to receive an analog pressure signal from a pressure sensor, a converter configured to convert the analog pressure signal to a digital pressure signal, and a processor configured to convert a pressure value of the digital pressure signal to a bit value corresponding to the pressure value and output the bit value. The processor is configured to convert the pressure value to a first bit value by a first bit resolution in response to the pressure value being included in a first pressure interval, and convert the pressure value to a second bit value by a second bit resolution in response to the pressure value being included in a second pressure interval. The second pressure interval is a pressure interval greater than the first pressure interval, and the first bit resolution is greater than the second bit resolution.

18 Claims, 8 Drawing Sheets

PRESSURE SENSING DEVICE AND PROCESSING METHOD THEREOF

CROSS-REFERENCE TO RELATED APPLICATIONS

This application claims the benefit of the filing date under 35 U.S.C. § 119(a)-(d) of Korean Patent Application No. 10-2019-0164966, filed on Dec. 11, 2019, Korean Patent Application No. 10-2019-0164968, filed on Dec. 11, 2019, and Korean Patent Application No. 10-2020-0155688 filed on Nov. 19, 2020.

FIELD OF THE INVENTION

The present disclosure relates to a sensing device and, more particularly, to a pressure sensing device.

BACKGROUND

A single-edge nibble transmission (SENT) protocol is a serial communication protocol used in the field of automotive technology to transmit sensed data to an electronic control unit (ECU). It uses a digital waveform and is thus simple in structure without a need for a transceiver circuit, requiring less cost. It is thus employed mainly as a sensor-embedded communication interface.

The recent development of autonomous driving technology has led to a growing demand for technology for accurately controlling a vehicle. In a vehicle, an ECU controls an operation of a brake based on an electrical signal transferred from a pressure sensing device. For accurate control and safety, a higher level of accuracy or precision may be required for an interval in which there is a low pressure in the pressure sensing device.

SUMMARY

A pressure sensing device includes a pressure signal receiver configured to receive an analog pressure signal from a pressure sensor, a converter configured to convert the analog pressure signal to a digital pressure signal, and a processor configured to convert a pressure value of the digital pressure signal to a bit value corresponding to the pressure value and output the bit value. The processor is configured to convert the pressure value to a first bit value by a first bit resolution in response to the pressure value being included in a first pressure interval, and convert the pressure value to a second bit value by a second bit resolution in response to the pressure value being included in a second pressure interval. The second pressure interval is a pressure interval greater than the first pressure interval, and the first bit resolution is greater than the second bit resolution.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
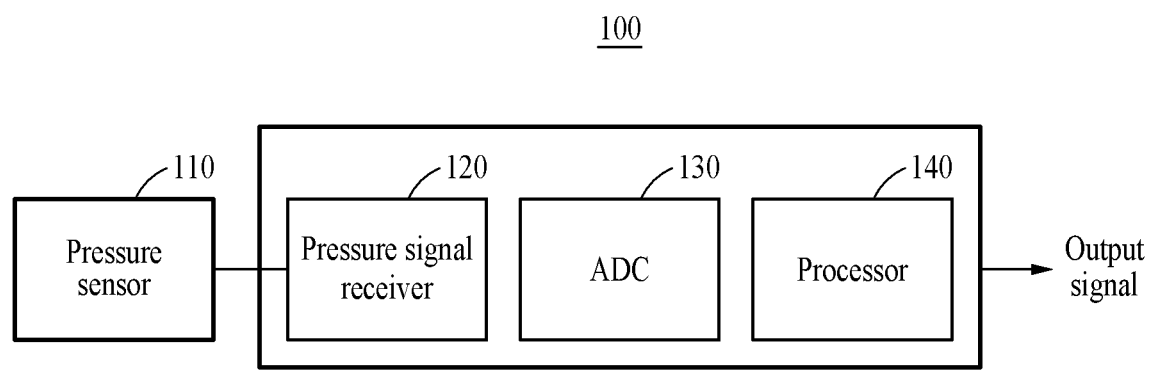
FIG. 1 is a block diagram of a pressure sensing device according to an embodiment.

Hereinafter, example embodiments will be described in detail with reference to the accompanying drawings. It should be understood, however, that there is no intent to limit this disclosure to the particular example embodiments disclosed. On the contrary, the disclosure is to cover all modifications, equivalents, and alternatives falling within the scope of the example embodiments.

The terminology used herein is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

A pressure sensing device 100 according to an embodiment, as shown in FIG. 1, includes a pressure signal receiver 120 configured to receive an analog pressure signal from a pressure sensor 110, a converter 130 configured to convert the analog pressure signal to a digital pressure signal, and a processor 140 configured to convert a pressure value of the digital pressure signal to a bit value corresponding to the pressure value and output the bit value. The pressure sensor 110 may be present outside the pressure sensing device 100 or included in the pressure sensing device 100.

According to an example embodiment, the pressure sensing device 100 may be used to measure a brake fluid pressure of a pedal of a brake system of a vehicle. For stability and reactivity during autonomous driving, precise control may be required for a low-speed interval of the vehicle. Thus, a relatively higher level of accuracy or precision may be required for a relatively low-pressure interval than a relatively high-pressure interval during a sensing interval of a sensor. Although it is desirable to provide detailed information for all pressure ranges, an amount of data that is transmitted per unit time is generally limited in communication, and thus equally distributing limited data to all the pressure ranges sensed by the pressure sensor 110 may not be sufficient to provide information that is sufficiently accurate enough to suit a purpose. To improve a resolution of an output, a plurality of pressure sensing devices may be used. However, it may raise an issue of costs.

The processor 140 of the pressure sensing device 100 shown in FIG. 1 may divide a pressure sensing range of the pressure sensor 110 into a plurality of intervals, and convert a pressure value in each of the intervals to a corresponding bit value by a different bit resolution for each of the intervals. For example, when the pressure value of the digital pressure signal is included in a first pressure interval, the processor 140 may convert the pressure value to a first bit value by a first bit resolution. When the pressure value is included in a second pressure interval, the processor 140 may convert the pressure value to a second bit value by a second bit resolution. In this example, the second pressure interval may be an interval greater than the first pressure interval. The first bit resolution may be a bit resolution greater than the second bit resolution.

Data obtained through conversion may not include all sets of detailed information of original data, and thus there may be information that is lost. To have more detailed information, a greater resolution may be required. However, in some cases (e.g., single-edge nibble transmission [SENT] communication, etc.), an amount of data available to be used for data transmission may be limited. For example, when an output of a digital sensor device having an output range of a maximum X bar (X is a numeral greater than or equal to 0) is limited to n bit, the sensor device may convert a pressure value by a bit resolution (e.g., $X[bar]/(2^n-1)$) corresponding to a pressure sensing range and n bit, and thus may not be able to represent a value in an interval less than that. Since the sensor output is limited to n bit, a bit resolution may decrease and information that is not represented may increase as a pressure interval sensed by the sensor increases.

To achieve a greater resolution for a needed pressure interval in limited data, the processor 140 may apply a greater resolution to a lower pressure interval that requires a higher level of accuracy. For example, the processor 140 may set an interval with a relatively lower pressure to be the first pressure interval and an interval with a relatively greater pressure to be the second pressure interval, and apply the first bit resolution that is greater than the second bit resolution to a pressure value of the first pressure interval, and then convert the pressure value to a corresponding bit value. In this example, the processor 140 may apply the second bit resolution that is smaller than the first bit resolution to a pressure value of the second pressure interval, and then convert the pressure value to a corresponding bit value. Thus, the pressure sensing device 100 may output a highly accurate signal for a required pressure interval using only a single sensor without a separate change in a circuit or an additional sensor, and thus it may be economically effective.

According to an example embodiment, the processor 140 may generate an output signal based on the bit value obtained through the conversion. The output signal may include the pressure value corresponding to the bit value. The output signal of the pressure sensing device 100 may be a signal that conforms to a SENT communication standard. The output signal may be a 12-bit output, but examples of which are not limited thereto. For example, an output of the pressure sensing device 100 may be an n-bit output according to the purpose of use. In this example, n denotes a constant. The output signal may include a first output signal and a second output signal. The first output signal and the second output signal will be described in detail with reference to FIGS. 3 through 7. The pressure sensing device 100 may then output the generated output signal.

Figure 2:
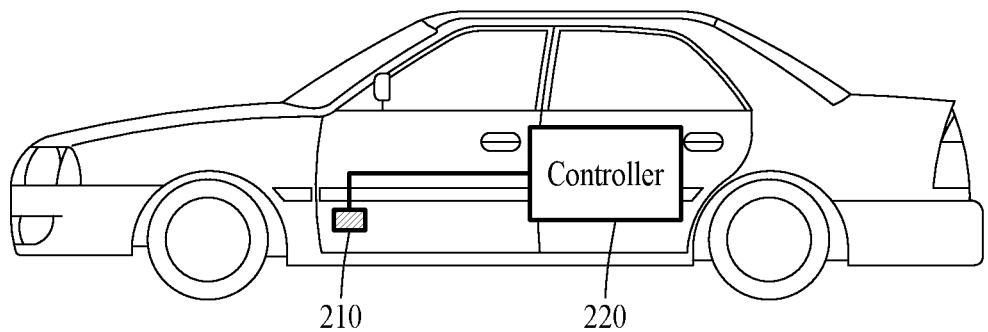
FIG. 2 is a block diagram of a control system of a vehicle to which a pressure sensing device is applied according to an embodiment.

FIG. 2 is a diagram illustrating an example of a control system of a vehicle to which a pressure sensing device 210 is applied according to an example embodiment. Referring to FIG. 2, the pressure sensing device 210 (e.g., the pressure sensing device 100 of FIG. 1) may be provided in a vehicle to be used. According to an example embodiment, the pressure sensing device 210 may be embodied using, for example, a bridge circuit that outputs a variable voltage based on a physical change applied from outside, and may be used to measure a brake fluid pressure of a pedal of a brake system and the like of the vehicle. For example, the pressure sensing device 210 may be installed in a hydraulic block (or hydraulic unit) of an anti-lock brake system (ABS) that electronically controls a pedal force of a brake of the vehicle.

The pressure sensing device 210 may sense a brake operating pressure that is generated in a master cylinder in proportion to a pedal force of the brake from a driver, and transfer an electrical signal corresponding to the sensed brake operating pressure to a controller 220, shown in FIG. 2. The controller 220 may be an electronic control device. The controller 220 may control an operation of the brake based on the electrical signal transferred from a pressure sensor. To accurately control the operation of the brake, the pressure sensor may need to have a high level of accuracy or precision. According to an example embodiment, for a high level of stability and reactivity, the pressure sensing device 210 may output a pressure signal with a higher level of accuracy for a relatively low pressure.

Figure 3:
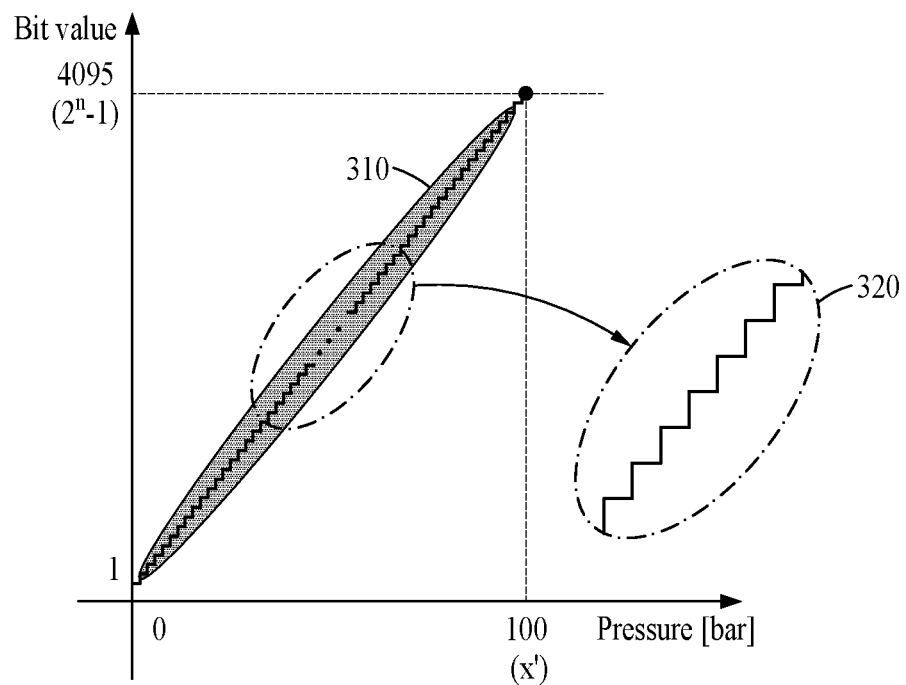
FIG. 3 is a graph of a portion of an interval in which a pressure sensing device converts a signal according to an embodiment.
Figure 4:
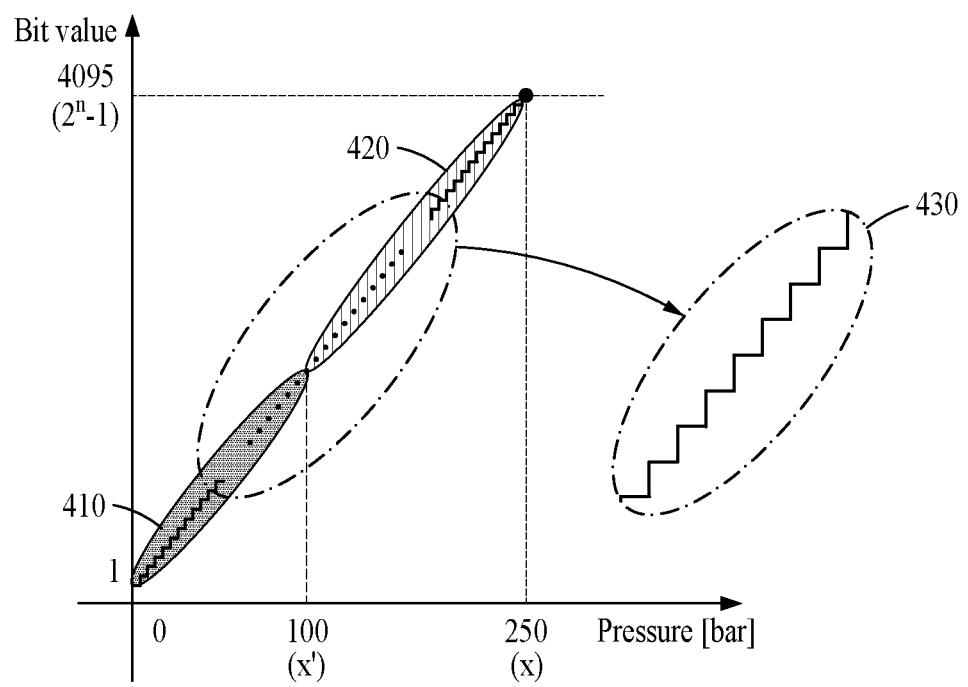
FIG. 4 is a graph of an entire interval in which a pressure sensing device converts a signal according to an embodiment.

FIG. 3 is a diagram illustrating an example of a portion of an interval in which a pressure sensing device converts a signal according to an example embodiment. FIG. 4 is a diagram illustrating an example of an entire interval in which a pressure sensing device converts a signal according to an example embodiment.

Referring to FIGS. 3 and 4, in illustrated graphs, an x axis indicates pressure, and a y axis indicates a bit value. In the examples of FIGS. 3 and 4, illustrated are a first pressure interval (e.g., a first pressure interval 310 in FIG. 3 and a first pressure interval 410 in FIG. 4) and a second pressure interval (e.g., a second pressure interval 420 in FIG. 4), and a 12-bit first output signal and a 12-bit second output signal are output. A pressure interval included in a pressure sensing range of a pressure sensor may not be limited to the two intervals, but be three or more intervals.

For example, the pressure sensor 110 may sense a pressure from 0 to X bar, and a processor 140 of a pressure sensing device 100 may receive a digital signal that is obtained by converting a pressure value sensed by the pressure sensor 110 by an analog-to-digital converter (ADC) 130. In this example, X may be 250. The processor 140 may then generate an n-bit output signal. Here, n bit may be a bit of the number that is determined in advance according to the purpose of use. The processor 140 may convert the pressure value to a bit value corresponding to the pressure value using a value of $2^n$ corresponding to n bit. For example, n may be 12, but examples of which are not limited thereto. The pressure sensing device 100 may use various bit numbers.

For safety and reactivity when the pressure sensing device 100 is applied to a self-driving vehicle or an autonomous vehicle, the pressure sensing device 100 may output a pressure signal with a higher level of accuracy for a low-pressure interval. Using $2^n$ bit values, it is possible to uniformly match pressure values in the range from 0 to X bar to bit values. However, using such a method, the same level of accuracy may be applied to a low-pressure interval and a great pressure interval, and thus the accuracy in the low-pressure interval may fall short of a level of accuracy required for the purpose.

The processor 140 may divide a pressure range to be sensed by the pressure sensor 110 into a first pressure interval (e.g., 310 and 410) and a second pressure interval (e.g., 420). The processor 140 may set, to be the first pressure interval (e.g., 310 and 410), an interval from 0 to X' bar, that is, 0<X'<X, for the pressure sensor 110 configured to sense from 0 to X bar. The processor 140 may set, to be the second pressure interval (e.g., 420), an interval from X' to X bar. A criterion for classifying the first pressure interval (e.g., 310 and 410) and the second pressure interval (e.g., 420) may differ depending on the purpose of use. For example, for the pressure sensor 110 that senses 0 to 250 bar, the processor 140 may set a range from 0 to 100 bar to be the first pressure interval (e.g., 310 and 410), and set a range from 100 to 250 bar to be the second pressure interval (e.g., 420).

For example, when a pressure value is included in the first pressure interval 310, the processor 140 may convert the pressure value to a corresponding bit value by a first bit resolution. In this example, the first bit resolution may be a bit resolution that represents the first pressure interval 310 as a first bit range. The first bit resolution may be a bit resolution that uniformly matches pressure values in the first pressure interval 310 to bit values in the first bit range. For example, n bit may be 12 bit. In this example, when the pressure value is included in the first pressure interval 310, the processor 140 may convert the pressure value to a corresponding bit value using the first pressure interval 310 and a bit range from 0 to 4095 that is represented by 12 bit. In this example, the first bit resolution may be greater, compared to a resolution in a case of converting the pressure value in the range from 0 to 250 bar by 12 bit, due to a narrower pressure interval.

For example, when a pressure value is included in the second pressure interval 420, the processor 140 may convert the pressure value to a corresponding bit value by a second bit resolution. In this example, the second bit resolution may be a bit resolution that represents, as a first bit range, an entire pressure interval including the first pressure interval 410 and the second pressure interval 420. The second bit resolution may be a bit resolution that uniformly matches pressure values in the entire pressure interval to bit values in the first bit range. For example, n bit may be 12 bit. In this example, when the pressure value is included in the second pressure interval 420, the processor 140 may convert the pressure value to a corresponding bit value using the entire pressure interval and a bit range from 0 to 4095 that is represented by 12 bit. In this example, the second bit resolution may be smaller than the first bit resolution due to a greater pressure interval. Thus, for the first pressure interval, a relatively greater resolution may be implemented.

The processor 140 may generate an output signal including the bit value obtained through the conversion. The output signal may include a first output signal and a second output signal. For example, when a pressure value is included in the first pressure interval 310, the processor 140 may generate a first output signal including a first bit value obtained through the conversion by the first bit resolution. When a pressure value is included in the second pressure interval 420, the processor 140 may generate a second output signal including a second bit value obtained through the conversion by the second bit resolution. The first output signal may be output through a first output terminal of the pressure sensing device 100, and the second output signal may be output through a second output terminal of the pressure sensing device 100. For example, when a pressure value is included in the first pressure interval 410, the processor 140 may convert the pressure value to a third bit value by the second bit resolution, and generate a second output signal including the third bit value.

According to an example embodiment, a pressure value of the first pressure interval (e.g., 310 and 410) may be converted based on each of the first bit resolution and the second bit resolution. For example, when the pressure value is included in the first pressure interval (e.g., 310 and 410), the first output signal including the first bit value that is represented by the first bit resolution may be output through the first output terminal, and the second output signal including the third bit value that is represented by the second bit resolution may be output through the second output terminal. Depending on examples, when the pressure value is included in the first pressure interval (e.g., 310 and 410), both the first output signal and the second output signal may be output from the pressure sensing device 100, or only the first output signal may be output from the pressure sensing device 100.

TABLE 1

|  | Pressure range | Resolution |
| --- | --- | --- |
| First output signal | 0-100 bar | 100 bar/4095 |
| Second output signal | 0-250 bar | 250 bar/4095 |

Table 1 above indicates a resolution corresponding to an output signal of the pressure sensing device. Referring to FIG. 3 and Table 1 above, the first output signal may not include information associated with the second pressure interval 420 because all bit values in the first bit range are allocated with respect to the first pressure interval 310 in a process of generating the first output signal. The processor 140 may convert pressures value in the first pressure interval 310 by uniformly matching the pressure values in the first pressure interval 310 at a regular interval using 12 bit, and thus the first bit resolution may be 100 bar/4095 which is higher than 250 bar/4095 which is a bit resolution corresponding to the entire pressure interval and 12 bit. The second output signal may include information associated with all the intervals because bit values in the first bit range are allocated with respect to both the first pressure interval 310 and the second pressure interval 420 in a process of generating the second output signal. The processor 140 may convert pressure values in the second pressure interval 420 by uniformly matching the pressure values in the second pressure interval 420 at a regular interval using 12 bits, and thus the second bit resolution may be 250 bar/4095.

For another example, when the pressure value is included in the second pressure interval 420, the processor 140 may convert the pressure value to a corresponding bit value by a bit resolution that represents the second pressure interval 420 as a first bit range. The pressure sensing device 100 may be used for a task requiring a high level of accuracy for an interval with a great pressure. However, examples of the use of the pressure sensing device 100 are not limited thereto, and the pressure sensing device 100 may be used to provide a high level of accuracy for a needed pressure interval based on the purpose of use.

In the example of FIG. 3, an interval 320 is an enlarged portion of the first pressure interval 310 in which pressure values in the first pressure interval 310 are uniformly matched to 12-bit values at a regular interval. The processor 140 may perform the conversion by uniformly matching the pressure values in the first pressure interval 310 to the bit values at a regular interval as illustrated in the interval 320. In the example of FIG. 4, an interval 430 is an enlarged portion of an entire pressure interval including the first pressure interval 310 and the second pressure interval 420 in which pressure values in the entire pressure interval are uniformly matched to 12-bit values at a regular interval. The processor 140 may perform the conversion by uniformly matching the pressure values in the entire pressure interval including the first pressure interval 310 and the second pressure interval 420 at a regular interval as illustrated in the interval 430.

As needed, the first output signal may be used for a pressure value in the first pressure interval 310, and the second output signal may be used for a pressure value in the second pressure interval 420.

According to an example embodiment, the pressure sensing device 100 may classify the first pressure interval 310 and the second pressure interval 420 and perform the conversion, thereby sending out an output signal with a higher level of accuracy for a pressure value in the first pressure interval 310. Detailed numerals used for the conversion, for example, 12 bits and a pressure range from 0 to 250 bar, are provided merely as an example. Thus, the pressure sensing device 100 may use various pressure ranges, intervals, and bits, in addition to the detailed example numerals used herein.

Figure 5:
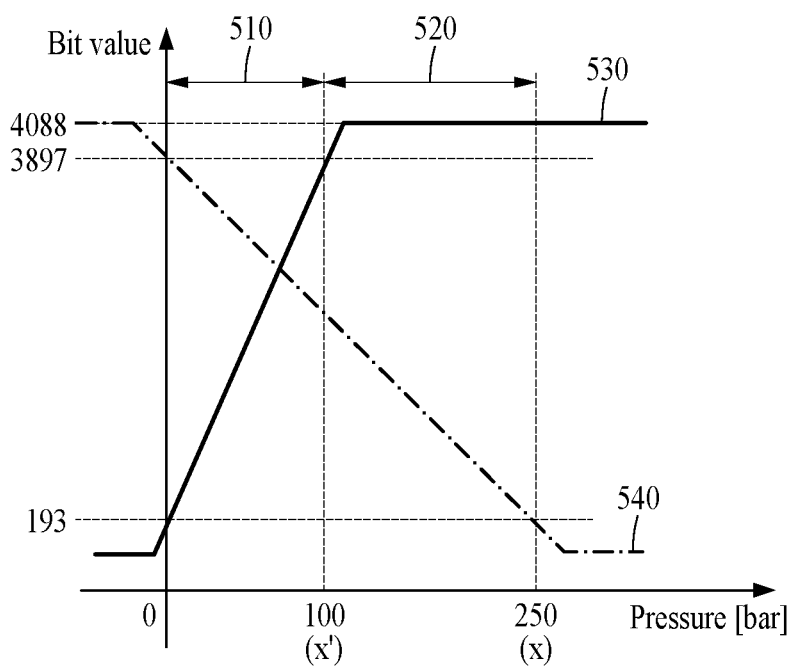
FIG. 5 is a graph of a bit resolution corresponding to an output signal of a pressure sensing device according to an embodiment.

FIG. 5 is a diagram illustrating an example of a bit resolution corresponding to an output signal of a pressure sensing device 110 according to an example embodiment. In the example of FIG. 5, illustrated are a bit resolution 530 corresponding to a first output signal and a bit resolution 540 corresponding to a second output signal, for each pressure interval according to a SENT communication standard of a pressure sensing device 110. As described above with reference to FIGS. 3 and 4, a processor 140 of the pressure sensing device 110 may divide a pressure range from 0 bar to X bar into a first pressure interval 510 from 0 bar to X' bar and a second pressure interval 520 from X' bar to X bar. For example, X' may be 100 and X may be 250.

The processor 140 may convert a pressure value to a corresponding bit value using a portion of $(2^n-1)$ intervals that are represented by n bit. Referring to FIG. 5, the processor 140 may convert a pressure value to a corresponding bit value using a bit range from 193 to 3897 in a bit range from 0 to 4095, although using 12 bit.

For example, when the pressure value is included in the first pressure interval 510, the processor 140 may convert the pressure value to a corresponding bit value by a bit resolution that represents the first pressure interval 510 as the bit range from 193 to 3897, and generate a first output signal based on the bit value obtained through the conversion. By performing the conversion using 3074 bit values for the interval from 0 to 100 bar, the processor 140 may generate the first output signal based on a relatively improved 0.027 bar/SENT resolution.

When the pressure value is included in the second pressure interval 520, the processor 140 may convert the pressure value to a corresponding bit value by a bit resolution that represents an entire pressure interval including the first pressure interval 510 and the second pressure interval 520 as a bit range from 3897 to 193, and generate a second output signal based on the bit value obtained through the conversion. By resolving using 3704 bit values for the interval from 0 to 250 bar, the second output signal may have a 0.067 bar/SENT resolution.

Detailed numerals used herein, for example, 193, 3897, and 3704, are provided merely as an example, and thus the conversion may be performed using various bit numbers, bit values, and pressure intervals depending on the purpose of use.

According to an example embodiment, a pressure value of a first output signal and a pressure value of a second output signal may be calculated as represented by Equation 1 below.

$$P1[bar] = \frac{P[DEC] - 193}{3704} \times 100 \qquad \text{[Equation 1]}$$
$$P2[bar] = \frac{3897 - P[DEC]}{3704} \times 250$$

In Equation 1, P1 denotes a pressure value indicated by a first output signal, and P2 denotes a pressure value indicated by a second output signal. P denotes a 12 bit value of a digital signal corresponding to a pressure value sensed by a pressure sensor 110. In each equation, 3704 which is a denominator denotes the number of bit values in a bit range corresponding to each pressure interval.

Figure 6:
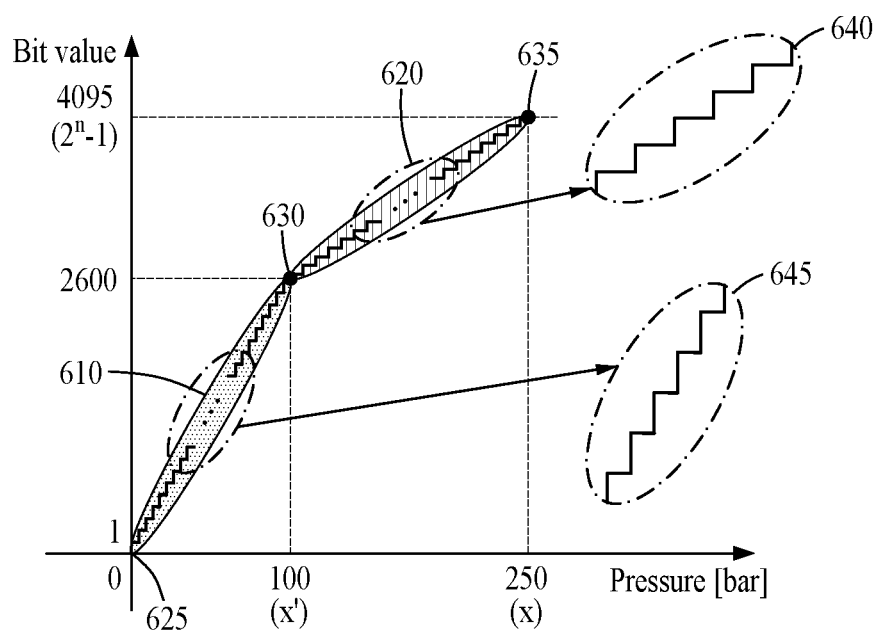
FIG. 6 is a graph of an interval in which a pressure sensing device converts a signal according to another embodiment.

FIG. 6 is a diagram illustrating an example of an interval in which a pressure sensing device 100 converts a signal according to another example embodiment. Referring to FIG. 6, an x axis of an illustrated graph indicates a pressure, and a y axis of the graph indicates a bit value. In the example of FIG. 6, illustrated are a first pressure interval 610 and a second pressure interval 620, and a 12-bit first output signal and a 12-bit second output signal are output. A pressure interval included in a pressure sensing range of a pressure sensor 110 may be three or more intervals as well as two intervals as illustrated (e.g., the first pressure interval 610 and the second pressure interval 620).

According to an example embodiment, a processor 140 of the pressure sensing device 100 may divide a pressure sensing range into intervals, and convert a pressure value included in each of the intervals to a corresponding bit value using a predetermined number of bits while applying a different bit resolution to each interval.

For example, with respect to the pressure sensor that senses 0 to X bar, the processor 140 may set an interval from 1 to X' bar (0<X'<X) to be the first pressure interval 610, and set an interval from X' to X bar to be the second pressure interval 620. A criterion for classifying the first pressure interval 610 and the second pressure interval 620 may vary depending on the purpose of use, and X may be 250. For example, with respect to the pressure sensor 110 that senses 0 to 250 bar, the processor 140 may set an interval from 0 to 100 bar to be the first pressure interval 610, and set an interval from 100 to 250 bar to be the second pressure interval 620.

For example, when a pressure value is included in the first pressure interval 610, the processor 140 may convert the pressure value to a corresponding bit value by a first bit resolution that represents the first pressure interval 610 as a first bit range which is a portion of a bit range from 0 to $(2^n-1)$ that is represented by n bit. The first bit resolution may be a bit resolution that uniformly matches pressure values in the first pressure interval 610 to bit values in the first bit range. For example, n bit may be 12 bit. In this example, when the pressure value is included in the first pressure interval 610, the processor 140 may convert the pressure value to a corresponding bit value by the first bit resolution that represents the first pressure interval 610 as a bit range from 0 to 2600 which is a portion of a bit range from 0 to 4095 that is represented by 12 bit. Here, a bit range used for the conversion may be determined to obtain a resolution that suits the purpose of use.

For example, when the pressure value is included in the second pressure interval 620, the processor 140 may convert the pressure value to a corresponding bit value by a second bit resolution that represents the second pressure interval 620 as a second bit range in a bit range that is represented by n bit. The second bit resolution may be a bit resolution that uniformly matches pressure values in the second pressure interval 620 to bit values in the second bit range. For example, n bit may be 12 bit. In this example, when the pressure value is included in the second pressure interval 620, the processor 140 may convert the pressure value to a corresponding bit value by the second bit resolution that represents the second pressure interval 620 to a second bit range from 2600 to 4095. Thus, the first bit resolution may be greater than the second bit resolution, and a relatively greater resolution may be implemented for the first pressure interval 610. When a relatively greater resolution is required for the first pressure interval 610 and a required value of a resolution for the second pressure interval 620 is relatively low, the pressure sensing device 100 may satisfy such a requirement without an additional sensor or cost. Here, the first pressure interval 610, the second pressure interval 620, and the bit ranges used for the conversion are provided merely as examples, and thus various bit numbers and intervals may be used according to the purpose of use. In addition, it is possible to adjust a bit value used herein such that a greater bit resolution is applied to a pressure value in the second pressure interval 620.

For such uniform conversion at a regular interval for each interval by the application of different bit resolutions to the two intervals—the first pressure interval 610 and the second pressure interval 620, three-point mapping using three points 625, 630, and 635 may be used.

The processor 140 may generate an output signal based on the bit value obtained through the conversion, and the output signal may include the pressure value corresponding to the bit value. The output signal may include a first output signal and a second output signal. The pressure sensing device 100 may include a first output terminal from which the first output signal is output, and a second output terminal from which the second output signal is output. For example, when the pressure value is included in the first pressure interval 610, the processor 140 may generate the first output signal based on the bit value obtained through the conversion by the first bit resolution. When the pressure value is included in the second pressure interval 620, the processor 140 may generate the second output signal based on the bit value obtained through the conversion by the second bit resolution.

TABLE 2

|  | Pressure range | Resolution |
| --- | --- | --- |
| First output signal | 0-100 bar | 100 bar/2600 |
|  | 100-250 bar | 150 bar/1495 |
| Second output signal | 0-100 bar | 100 bar/2600 |
|  | 100-250 bar | 150 bar/1495 |

Table 2 above indicates a resolution corresponding to an output signal of the pressure sensing device 100. Referring to FIG. 6 and Table 2 above, the first output signal and the second output signal may include information associated with the first pressure interval 610 and the second pressure interval 620. The processor 140 may perform the uniform matching on pressure values in the first pressure interval 610 using a bit range from 0 to 2600 of a bit range from 0 to 4095 using 12 bit. Here, the first bit resolution may be 100 bar/2600, which may be higher than 250 bar/4095 which is a bit resolution corresponding to the entire pressure interval and 12 bit.

The processor 140 may perform the uniform matching on pressure values in the second pressure interval 620 using a bit range from 2600 to 4095 of the bit range from 0 to 4095 using 12 bit. Here, the second bit resolution may be 150 bar/1495, which may be lower than 250 bar/4095 which is the bit resolution corresponding to the entire pressure interval and 12 bit. The first output signal and the second output signal may include same information, and thus one of the two signals may be output or used.

In the example of FIG. 6, an interval 645 is an enlarged portion of the first pressure interval 610 in which pressure values in the first pressure interval 610 are matched to the first bit range of 12 bit. The processor 140 may uniformly match the pressure values in the first pressure interval 610 to bit values at a regular interval as illustrated in the interval 645. An interval 640 is an enlarged portion of the second pressure interval 620 in which pressure values in the second pressure interval 620 are matched to the second bit range of 12 bit. The processor 140 may uniformly match the pressure values in the second pressure interval 620 to bit values at a regular interval as illustrated in the interval 640.

The pressure sensing device 100 may classify the first pressure interval 610 and the second pressure interval 620 and perform the conversion accordingly, and send out an output signal with a higher level of accuracy for a pressure value in the first pressure interval 610. Detailed numerals used for the conversion, for example, 12 bits, a pressure range from 0 to 250 bar, and the like, are provided merely as examples, and thus the pressure sensing device 100 may use other various pressure ranges, intervals, and bits according to the purpose of use.

Figure 7:
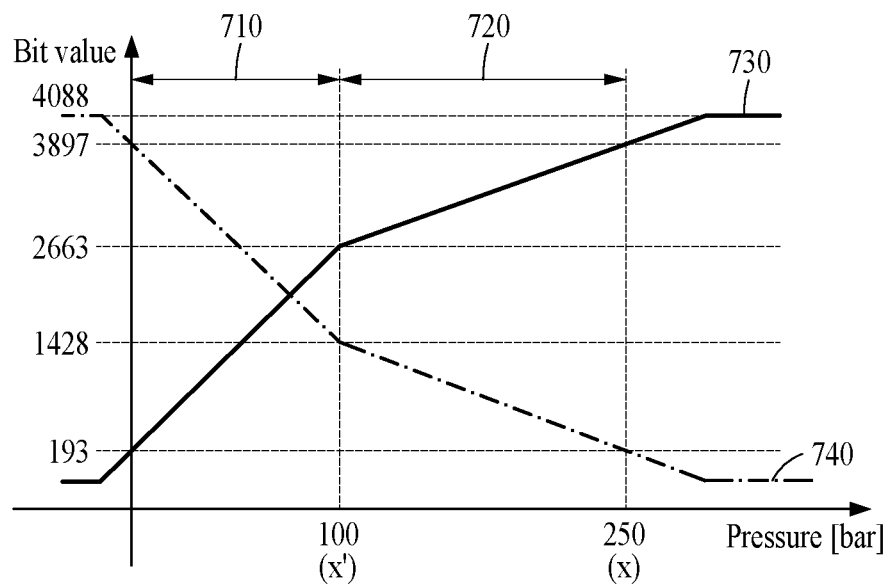
FIG. 7 is a graph of a bit resolution corresponding to an output signal of a pressure sensing device according to another embodiment.

FIG. 7 is a diagram illustrating an example of a bit resolution corresponding to an output signal of a pressure sensing device 100 according to another example embodiment. In the example of FIG. 7, illustrated are a resolution 730 of a first output signal and a resolution 740 of a second output signal for each pressure interval of a pressure sensing device 100. A processor 140 of the pressure sensing device 100 may divide a pressure range from 0 bar to X bar into a first pressure interval 710 from 0 bar to X' bar and a second pressure interval 720 from X' bar to X bar, as illustrated in FIG. 7. In this example, X' may be 100 and X may be 250.

The processor 140 may convert a pressure value to a corresponding bit value using a portion of $(2^n-1)$ bit values that are represented by n bit. Referring to FIG. 7, the processor 140 may convert a pressure value to a corresponding bit value using a bit range from 193 to 3897 in a bit range from 0 to 4095, although using 12 bit.

For example, when pressure values are included in the first pressure interval 710, the processor 140 may uniformly convert the pressure values to corresponding bit values at a regular interval by a first bit resolution that represents the first pressure interval 710 as a bit range from 193 to 2663. When pressure values are included in the second pressure interval 720, the processor 140 may uniformly convert the pressure values to corresponding bit values at a regular interval by a second bit resolution that represents the second pressure interval 720 as a bit range from 2663 to 3897. The processor 140 may generate a first output signal based on the bit values obtained through the conversion by the first bit resolution and the second bit resolution.

For example, when pressure values are included in the first pressure interval 710, the processor 140 may uniformly convert the pressure values to corresponding bit values at a regular interval by a first bit resolution that represents the first pressure interval 710 as a bit range from 3897 to 1428. When pressure values are included in the second pressure interval 720, the processor 140 may uniformly convert the pressures value to corresponding bit values at a regular interval by a second bit resolution that represents the second pressure interval 720 as a bit range 1428 to 193. The processor 140 may generate a second output signal based on the bit values obtained through the conversion by the first bit resolution and the second bit resolution.

By converting a pressure value in an interval from 0 to 100 bar using 2470 bit values included in the bit range from 193 to 2663 or the bit range from 3897 to 1428, the first output signal and the second output signal may be generated based on a relatively improved 0.04 bar/SENT resolution for the pressure value in the first pressure interval 710. In addition, by converting a pressure value in an interval from 100 to 250 bar using 1234 bit values included in the bit range from 2663 to 3897 or the bit range from 1428 to 193, the first output signal and the second output signal may have a 0.122 bar/SENT resolution for the pressure value in the second pressure interval 720. According to an example embodiment, a sum of a bit value included in the first output signal and a bit value included in the second output signal may be the same in a first pressure interval and a second pressure interval. Detailed numerals, for example, 193, 1428, 2663, 3897, 2470, and 1234 bit values, are provided merely as examples, and thus the conversion of a pressure value may be performed using various bit numbers, bit values, and pressure intervals according to the purpose of use.

According to an example embodiment, a pressure value of each of a first output signal and a second output signal with respect to the first pressure interval 710 may be calculated as represented by Equation 2 below.

$$P1[\text{bar}] = \frac{P[DEC] - 193}{2470} \times 100 \qquad [\text{Equation 2}]$$
$$P2[\text{bar}] = \frac{3897 - P[DEC]}{2470} \times 100$$

In Equation 2, P1 denotes a pressure indicated by the first output signal, and P2 denotes a pressure indicated by the second output signal. P denotes a 12 bit value of a digital signal corresponding to a pressure value sensed by a pressure sensor 110. In each equation, 2470 which is a denominator denotes the number of bit values in a bit range corresponding to the first pressure interval 710.

According to an example embodiment, a pressure value of each of a first output signal and a second output signal with respect to the second pressure interval 720 may be calculated as represented by Equation 3 below.

$$P1[\text{bar}] = \frac{P[DEC] - 2663}{1234} \times 150 + 100 \qquad [\text{Equation 3}]$$
$$P2[\text{bar}] = \frac{1428 - P[DEC]}{1234} \times 150 + 100$$

In Equation 3, P1 denotes a pressure indicated by the first output signal, and P2 denotes a pressure indicated by the second output signal. P denotes a 12 bit value of a digital signal corresponding to a pressure value sensed by the pressure sensor 110. In each equation, 1234 which is a denominator denotes the number of bit values corresponding to the second pressure interval 720.

According to an example embodiment, although the first output signal and the second output signal indicate the same pressure, the first output signal and the second output signal may be complementary to each other because they are generated using different values among values represented by a predetermined number of bits as described above with reference to FIG. 7. According to an example embodiment, one of the first output signal and the second output signal may be generated and output.

Figure 8:
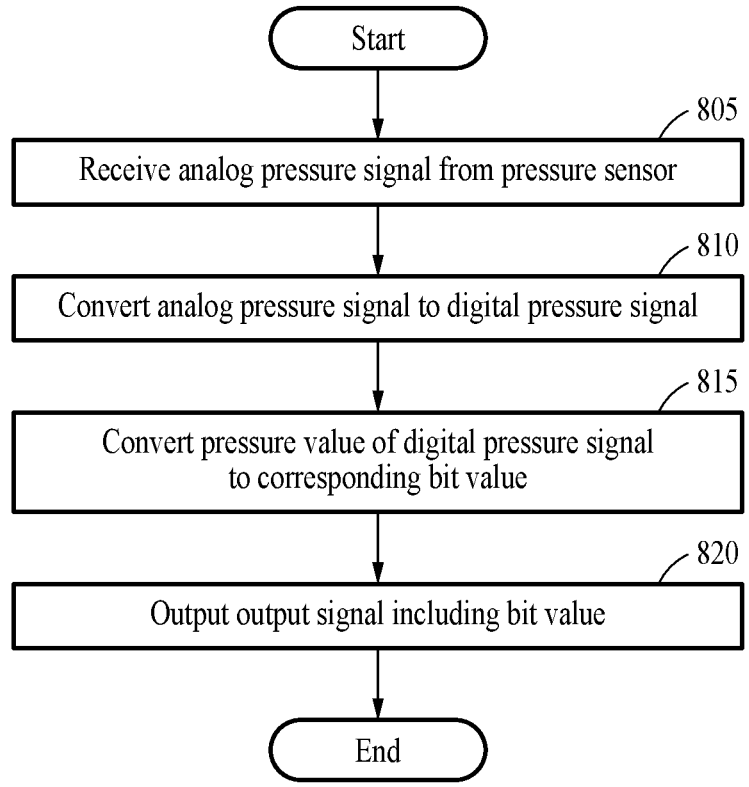
FIG. 8 is a flowchart of a processing method of a pressure sensing device according to an embodiment.

FIG. 8 is a flowchart illustrating an example of a processing method of a pressure sensing device 100 according to an example embodiment. Referring to FIG. 8, according to an example embodiment, a processing method of a pressure sensing device 100 includes operation 805 of receiving an analog pressure signal from a pressure sensor 110, operation 810 of converting the received analog pressure signal to a digital pressure signal, operation 815 of converting a pressure value of the digital pressure signal to a bit value corresponding to the pressure value, and operation 820 of outputting an output signal including the bit value.

According to an example embodiment, the pressure sensing device 100 may be used for a self-driving vehicle or an autonomous vehicle. For safety and reactivity during autonomous driving, precise control is required for a low-speed interval of the vehicle, and thus a greater level of precision or accuracy may be required for a relatively low-pressure interval than a relatively high-pressure interval in a sensing interval of a sensor.

In detail, operation 815 may include a detailed operation of converting the pressure value to a first bit value by a first bit resolution when the pressure value is included in a first pressure interval, and a detailed operation of converting the pressure value to a second bit value by a second bit resolution when the pressure value is included in a second pressure interval.

The second pressure interval may be a greater interval than the first pressure interval. The first bit resolution may be greater than the second bit resolution. However, the processing method is not limited thereto. Based on the purpose of use, the second bit resolution may be greater than the first bit resolution.

According to an example embodiment, the first bit resolution may be a bit resolution that represents the first pressure interval as a first bit range. The first bit resolution may be a bit resolution that uniformly matches pressure values in the first pressure interval to bit values in the first bit range. The second bit resolution may be a bit resolution that represents, as the first bit range, an entire pressure interval including the first pressure interval and the second pressure interval. The second bit resolution may be a bit resolution that uniformly matches pressure values in the entire pressure interval to bit values in the first bit range. Here, the first bit resolution may use the same number of bits for a smaller or narrower interval compared to the second bit resolution, and may thus be greater than the second bit resolution.

According to another example embodiment, the first bit resolution may be a bit resolution that represents the first pressure interval as a first bit range. The second bit resolution may be a bit resolution that represents the second pressure interval as a second bit range. The first bit resolution may be a bit resolution that uniformly matches pressure values in the first pressure interval to bit values in the first bit range. The second bit resolution may be a bit resolution that uniformly matches pressure values in the second pressure interval to bit values in the second bit range.

The processing method may further include an operation of generating the output signal. The operation of generating the output signal may include a detailed operation of generating a first output signal including a first bit value obtained through conversion when the pressure value is included in the first pressure interval, and a detailed operation of generating a second output signal including a second bit value obtained through conversion when the pressure value is included in the second pressure interval.

According to an example embodiment, operation 820 of outputting the output signal may include a detailed operation of outputting the first output signal through a first output terminal of the pressure sensing device 100, and a detailed operation of outputting the second output signal through a second output terminal of the pressure sensing device 100.

According to another example embodiment, operation 820 of outputting the output signal may further include a detailed operation of outputting a first output signal through the first output terminal of the pressure sensing device 100 and a detailed operation of outputting a second output signal through the second output terminal of the pressure sensing device 100. According to another example embodiment, a sum of a bit value included in the first output signal and a bit value included in the second output signal may be the same in the first pressure interval and the second pressure interval. The output signal may be a signal that conforms to a SENT communication standard.

For a detailed description of the processing method, reference may be made to what has been described above with reference to FIGS. 3 through 5, and 6 and 7.

As described herein, it is possible to convert a pressure value to a corresponding bit value by a higher resolution for a pressure value in a low-pressure interval, and generate a corresponding output signal.

The units described herein may be implemented using hardware components and software components. For example, the hardware components may include microphones, amplifiers, band-pass filters, audio to digital convertors, non-transitory computer memory and processing devices. A processing device 140 may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device 140 may run an operating system (OS) and one or more software applications that run on the OS. The processing device 140 also may access, store, manipulate, process, and create data in response to execution of the software. For purpose of simplicity, the description of a processing device 140 is used as singular; however, one skilled in the art will appreciated that a processing device 140 may include multiple processing elements and multiple types of processing elements. For example, a processing device 140 may include multiple processors or a processor and a controller. In addition, different processing configurations are possible, such a parallel processors.

The software may include a computer program, a piece of code, an instruction, or some combination thereof, to independently or collectively instruct or configure the processing device 140 to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device 140.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blu-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter.

The above-described devices may be configured to act as one or more software modules to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A pressure sensing device, comprising:
   a pressure signal receiver configured to receive an analog pressure signal from a pressure sensor;
   a converter configured to convert the analog pressure signal to a digital pressure signal; and
   a processor configured to convert a pressure value of the digital pressure signal to a bit value corresponding to the pressure value and output the bit value, in response to the pressure value being included in a first pressure interval, the processor converts the pressure value to a first bit value by a first bit resolution, and in response to the pressure value being included in a second pressure interval, the processor converts the pressure value to a second bit value by a second bit resolution, the second pressure interval is greater than the first pressure interval and the first bit resolution is greater than the second bit resolution.

2. The pressure sensing device of claim 1, wherein the first bit resolution represents the first pressure interval as a first bit range and the second bit resolution represents, as the first bit range, an entire pressure interval including the first pressure interval and the second pressure interval.

3. The pressure sensing device of claim 2, wherein the first bit resolution represents pressure values in the first pressure interval by uniformly matching the pressure values to bit values in the first bit range, and the second bit resolution represents pressure values in the entire pressure interval including the first pressure interval and the second pressure interval by uniformly matching the pressure values to bit values in the first bit range.

4. The pressure sensing device of claim 2, wherein the processor is configured to:
   in response to the pressure value being included in the first pressure interval, generate a first output signal including the first bit value; and
   in response to the pressure value being included in the second pressure interval, generate a second output signal including the second bit value.

5. The pressure sensing device of claim 4, wherein the first output signal is output through a first output terminal of the pressure sensing device and the second output signal is output through a second output terminal of the pressure sensing device.

6. The pressure sensing device of claim 1, wherein the first bit resolution represents the first pressure interval as a first bit range and the second bit resolution represents the second pressure interval as a second bit range.

7. The pressure sensing device of claim 6, wherein the first bit resolution represents pressure values in the first pressure interval by uniformly matching the pressure values to bit values in the first bit range, and the second bit resolution represents pressure values in the second pressure interval by uniformly matching the pressure values to bit values in the second bit range.

8. The pressure sensing device of claim 7, further comprising:
   a first output terminal from which a first output signal is output; and
   a second output terminal from which a second output signal is output.

9. The pressure sensing device of claim 8, wherein a sum of a bit value included in the first output signal and a bit value included in the second output signal is equal in the first pressure interval and the second pressure interval.

10. A processing method of a pressure sensing device, comprising:
    receiving an analog pressure signal from a pressure sensor;
    converting the analog pressure signal to a digital pressure signal;
    converting a pressure value of the digital pressure signal to a bit value corresponding to the pressure value, the converting to the bit value includes, in response to the pressure value being included in a first pressure interval, converting the pressure value to a first bit value by a first bit resolution, and in response to the pressure value being included in a second pressure interval, converting the pressure value to a second bit value by a second bit resolution, the second pressure interval is greater than the first pressure interval and the first bit resolution is greater than the second bit resolution; and
    outputting an output signal including the bit value.

11. The processing method of claim 10, wherein the first bit resolution represents the first pressure interval as a first bit range and the second bit resolution represents, as the first bit range, an entire pressure interval including the first pressure interval and the second pressure interval.

12. The processing method of claim 11, wherein the first bit resolution represents pressure values in the first pressure interval by uniformly matching the pressure values to bit values in the first bit range, and the second bit resolution represents pressure values in the entire pressure interval including the first pressure interval and the second pressure interval by uniformly matching the pressure values to bit values in the first bit range.

13. The processing method of claim 11, wherein the outputting of the output signal includes:
    in response to the pressure value being included in the first pressure interval, generating a first output signal including the first bit value; and
    in response to the pressure value being included in the second pressure interval, generating a second output signal including the second bit value.

14. The processing method of claim 13, wherein the outputting of the output signal includes:

outputting the first output signal through a first output terminal of the pressure sensing device; and outputting the second output signal through a second output terminal of the pressure sensing device.

15. The processing method of claim 10, wherein the first bit resolution represents the first pressure interval as a first bit range and the second bit resolution represents the second pressure interval as a second bit range.

16. The processing method of claim 15, wherein the first bit resolution represents pressure values in the first pressure interval by uniformly matching the pressure values to bit values in the first bit range, and the second bit resolution represents pressure values in the second pressure interval by uniformly matching the pressure values to bit values in the second bit range.

17. The processing method of claim 16, wherein the outputting of the output signal includes:

outputting a first output signal through a first output terminal of the pressure sensing device; and outputting a second output signal through a second output terminal of the pressure sensing device.

18. The processing method of claim 17, wherein a sum of a bit value included in the first output signal and a bit value included in the second output signal is equal in the first pressure interval and the second pressure interval.

* * * * *